W. B. PEDELTY.
GEAR CASING.
APPLICATION FILED JULY 12, 1917.
1,258,447.
Patented Mar. 5, 1918.
2 SHEETS—SHEET 1.
FIG_1_
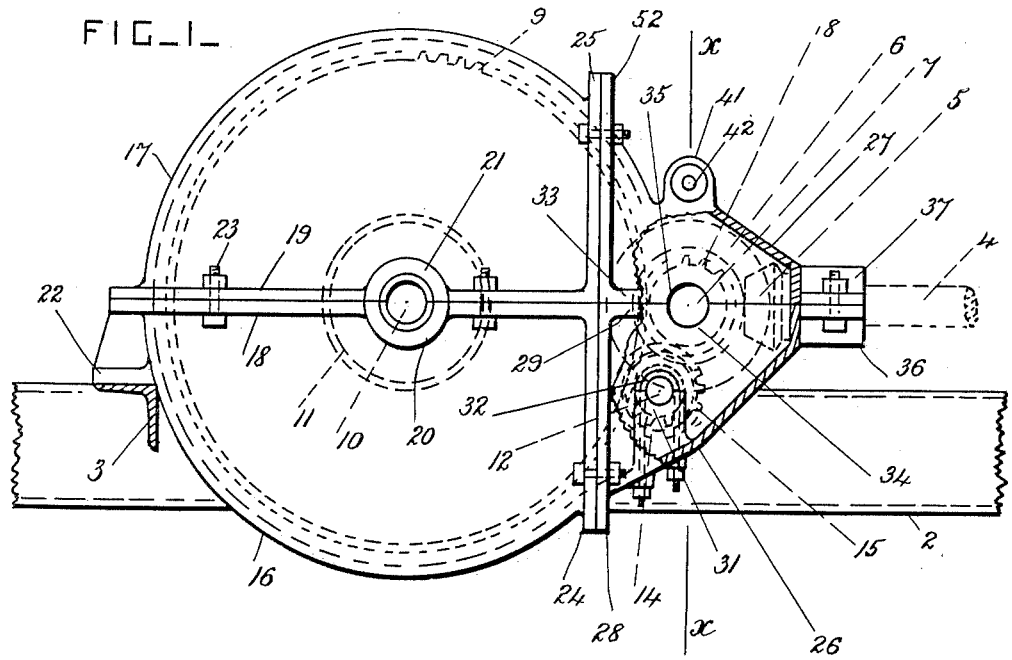
FIG_2_
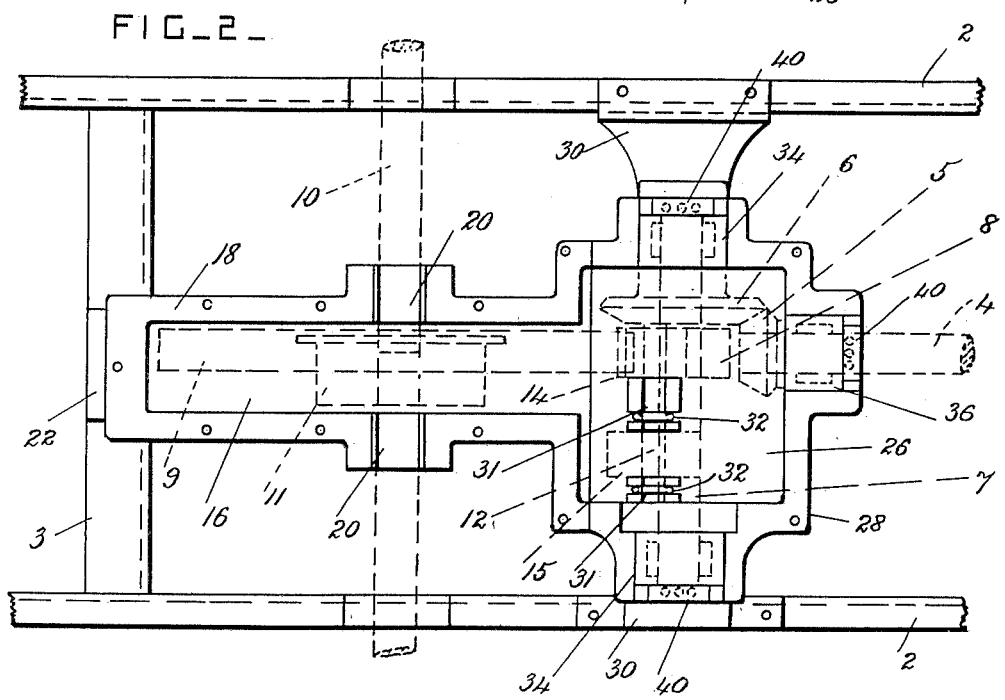
Inventor
Walter B. Pedelty
by Herbert W. T. Jenner
Attorney.

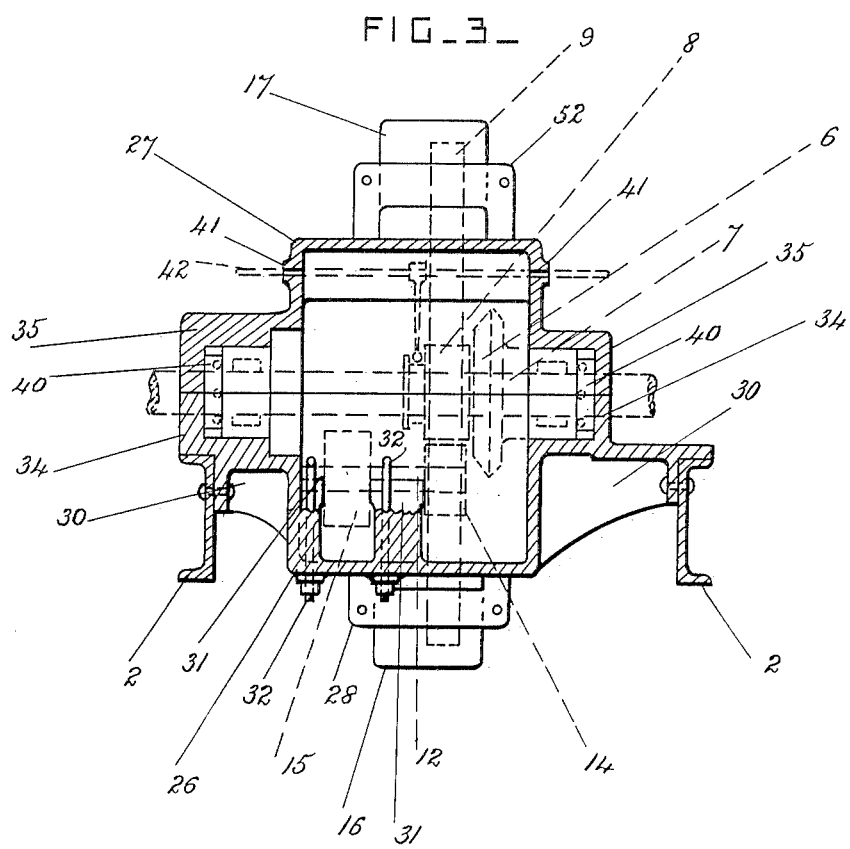

UNITED STATES PATENT OFFICE.

WALTER B. PEDELTY, OF MASON CITY, IOWA, ASSIGNOR TO THE AULTMAN AND TAYLOR MACHINERY COMPANY, OF MANSFIELD, OHIO.

GEAR-CASING.

1,258,447. Specification of Letters Patent. Patented Mar. 5, 1918.

Application filed July 12, 1917. Serial No. 180,138.

*To all whom it may concern:*

Be it known that I, WALTER B. PEDELTY, a citizen of the United States, residing at Mason City, in the county of Cerro Gordo and State of Iowa, have invented certain new and useful Improvements in Gear-Casings; and I do hereby declare the following to be a full, clear, and exact description of the invention, such as will enable others skilled in the art to which it appertains to make and use the same.

This invention relates to casings for inclosing the transmission gears of tractors and motor cars; and it consists in the novel construction and combination of the parts hereinafter fully described and claimed whereby an oil-tight and dust-proof casing is provided which also braces the main frame of the tractor, and which permits of ready access to the parts inclosed within it.

In the drawings, Figure 1 is a side view of the gear casing. Fig. 2 is a plan view, from above, of the lower portions of the gear casing. Fig. 3 is a cross-section through the gear casing, taken on the line *x—x* in Fig. 1.

The main frame of the tractor has two longitudinal side bars 2 which are preferably channel-shaped in cross-section, and an angle-shaped crossbar 3 is secured between the side bars at the rear end of the gear casing.

The transmission gearing consists essentially of a driving or motor shaft 4 having a beveled toothed pinion 5 secured on it and gearing into a beveled toothed wheel 6 secured on a cross-shaft 7. The cross-shaft 7 has a slidable toothed pinion 8 splined on it which gears into a toothed driving wheel 9 which is operatively connected with the sections of a counter-shaft 10 by means of a differential gear of approved construction inclosed in an internal casing 11. The sections of the counter-shaft are operatively connected with the road wheel of the tractor by any approved intermediate driving mechanism. A reversing shaft 12 is arranged below the cross-shaft 7, and has a toothed pinion 14 secured on it and gearing or meshing into the wheel 9, and it also has a small toothed wheel 15 secured on it for the pinion 8 to gear with when slid out of gear with the wheel 9. This gearing may be modified, and it is not claimed in this application.

The main portion of the gear casing is formed of two parts 16 and 17. These parts are each trough-shaped in form, and they comprise a relatively large segment of a cylinder. The part 17 is arranged above the part 16, and horizontal flanges 18 and 19 are provided on the respective parts at the axis of the cylinder. Half bearings 20 and 21 are provided on each side of the parts 16 and 17 respectively, for the sections of the countershaft to run in. These flanges are secured together by bolts 23, and the lower part 16 has a bracket 22 at its rear end which rests on the crossbar 3 of the frame. The periphery of the cylindrical segment is arranged concentric with the shaft bearings, and the segment incloses the wheel 9.

The front portions of the parts 16 and 17 have vertical flanges 24 and 25 respectively, arranged in line with each other upon a chord of the arc of the cylinder. The front portion of the casing is formed of two chambers 26 and 27 of irregular shape. The lower chamber 26 has a vertical flange 28 at its rear side which is secured to the flange 24, and it has a horizontal flange 29 at its top which is arranged in line with the flange 18.

The lower chamber 26 has also at its ends laterally projecting brackets 30 which are secured to the side bars 2 of the frame, so that the lower chamber 26 also forms a brace for the said side bars.

The lower chamber 26 has also at its ends, and inside it, two one-half bearings 31 for the reversing shaft 12 to rotate in, and 32 are loop-bolts which engage with the casing and retain the said shaft in its one-half bearings 31.

The upper chamber 27 has a vertical flange 52 which is secured to the flange 25, and it has a horizontal flange 33 which is secured to the flange 29. The upper part 17 and the upper chamber 27 can be removed together or separately, to give access to the parts inclosed in the casing. The chambers 26 and 27 have also two half bearings 34 and 35 respectively for the cross-shaft 7 to rotate in; and they also have half bearings 36 and 37 respectively for the driving shaft 4 to rotate in. These bearings and the half bearings 20, 21 are arranged on the horizontal center plane of their shafts, and they are preferably anti-friction bearings, such as roller bearings, of approved construction. Anti-friction bearings 40 are also preferably provided to take the end thrust of the shafts, and are preferably ball bearings. The half bearings 36, 37 are arranged on the opposite side of the chambers 26 and 27 from their vertical flanges.

The upper chamber has also lugs 41 for the reversing rod 42 to slide in. This reversing rod is provided for sliding the pinion 8 back and forth on its shaft.

The casing, when constructed in this manner, forms a receptacle for oil or grease, and it also prevents the entrance of dirt and dust to the gear wheels inclosed within it.

What I claim is:

1. A gear casing comprising an upper part and a lower part which together form a segment of a cylinder, said parts having half shaft bearings arranged concentric with their periphery, and having also horizontal flanges passing through their axis and vertical flanges at one end arranged upon a chord of the arc of the cylinder, and two chambers arranged one above the other and having horizontal flanges arranged in line with the aforesaid horizontal flanges, and vertical flanges arranged in line with each other and secured to the aforesaid vertical flanges, said chambers having also half shaft bearings at their sides and at their end opposite to their vertical flanges.

2. The combination, with a pair of longitudinal frame bars, and a crossbar brace secured between them, of a gear casing comprising an upper part and a lower part which together form a segment of a cylinder, said parts having half shaft bearings arranged concentric with their periphery, and having also horizontal flanges passing through their axis and vertical flanges at one end arranged upon a chord of the arc of the cylinder, and two chambers arranged one above the other and having horizontal flanges arranged in line with the aforesaid horizontal flanges, and vertical flanges arranged in line with each other and secured to the aforesaid vertical flanges, said chambers having also half shaft bearings at their sides and at their end opposite to their vertical flanges, said lower segmental part having also a bracket which engages with the said crossbar brace, and the said lower chamber having also brackets at its ends which are secured to the said frame bars so that the said chamber also forms a crossbrace between them.

In testimony whereof I affixed my signature.

WALTER B. PEDELTY.